Figure 1:
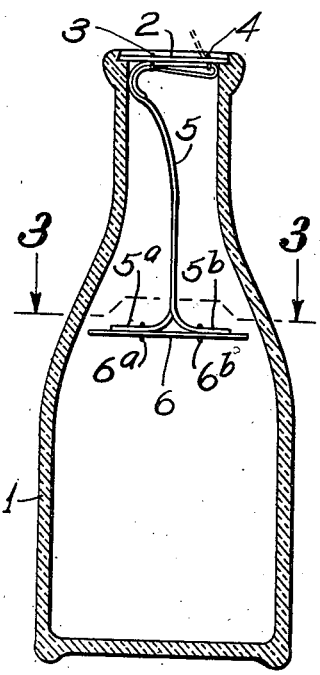

March 17, 1942.  E. HANSON  2,277,001
CREAM LINE SEPARATOR FOR MILK CONTAINERS
Filed Jan. 29, 1940

INVENTOR.
Ezekiel Hanson
BY A.B.Bowman
ATTORNEY.

Patented Mar. 17, 1942

2,277,001

UNITED STATES PATENT OFFICE 2,277,001

CREAM LINE SEPARATOR FOR MILK CONTAINERS

Ezekiel Hanson, San Diego, Calif.

Application January 29, 1940, Serial No. 316,162

5 Claims. (Cl. 210—51.5)

My invention relates to a cream line separator for milk containers, more particularly adapted to be placed in a delivery container at the time of filling the same for separating and supporting the cream separately from the milk so that the cream may be poured from the container and leaving the milk substantially all in position in the container and the objects of my invention are:

First, to provide a separator of this class which is applicable for use in connection with various kinds of milk containers at the time the container is filled;

Second, to provide a separator of this class by the use of which the cream in the upper part of the milk container may be separated and poured from the container in the same manner as milk is poured conventionally from the conventional container without inserting anything in the container by the consumer;

Third, to provide a separator of this class by the use of which the separator may be so arranged and positioned that the milk may be agitated and mixed with the cream, if desired, in the conventional manner;

Fourth, to provide a separator of this class which is so arranged and positioned in the container that the cream readily rises above the separator so that substantially all of the cream is on the top of the milk before separation;

Fifth, to provide a separator of this class which is placed in a free hanging position substantially on the line between the cream and milk in the container and may be shifted to complete separation of the cream and milk or to permit flow of the cream and milk relatively to each other;

Sixth, to provide a separator of this class which may be shifted to closed or open position from the upper outer part of the container;

Seventh, to provide a separator of this class which may be readily placed and completely enclosed in the container or readily removed therefrom;

Eighth, to provide a separator of this class which can be so economically constructed that it may be readily thrown away after one use;

Ninth, to provide a separator of this class which may be connected in connection with the conventional container paper stopper and may be readily removed therefrom or attached thereto;

Tenth, to provide a separator of this class in which the cream and milk may be held in separate distinct portions so that the container may be moved or transported and the cream kept entirely separate from the milk during such transportation after which the cream may be poured from the container separate from the milk or the two mixed together, as desired;

Eleventh, to provide a separator of this class which is made of sanitary non-metallic flexible moisture-proof material; and Twelfth, to provide a separator of this class which is very simple and economical of construction, easy to operate, efficient in its action and which will not readily deteriorate or get out of order.

Figure 2:
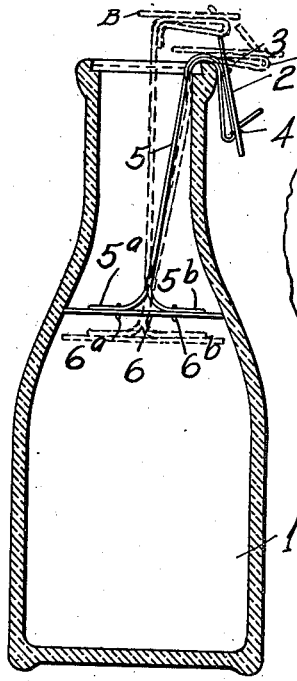
Figure 3:
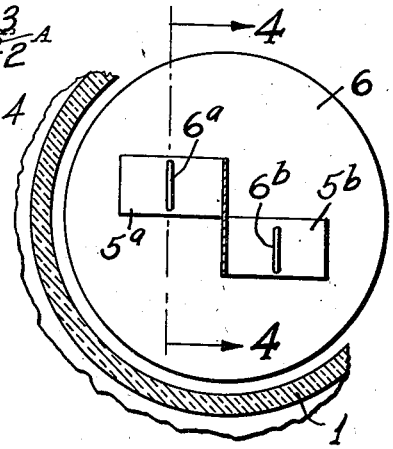
Figure 4:
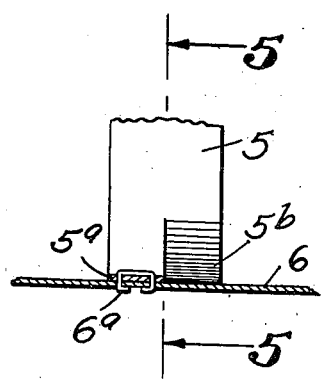
Figure 6:
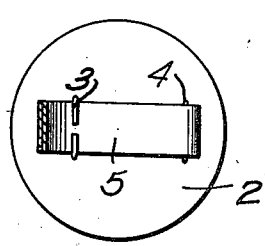
Figure 5:
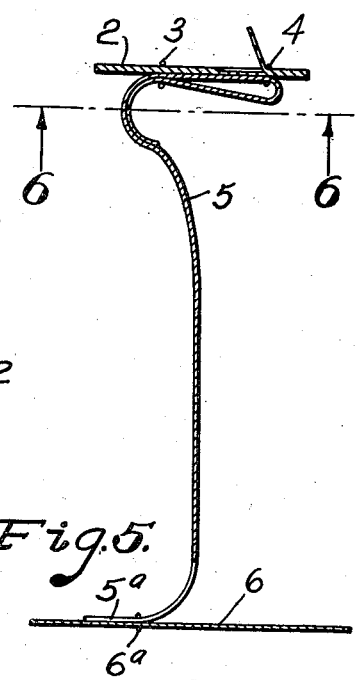

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a longitudinal sectional view of a milk container in the form of a bottle and showing my separator positioned therein spaced from the bottle to permit the ready rising of the cream to the top; Fig. 2 is a sectional view of a container in the form of a bottle showing the separator positioned in raised position definitely separating the milk from the cream and with the conventional milk container paper cap removed ready for pouring the cream from the container separate from the milk and showing by dash lines varying changeable positions of my cream line separator; Fig. 3 is a fragmentary sectional view on an enlarged scale taken from the line 3—3 of Fig. 1; Fig. 4 is a fragmentary sectional view taken from the line 4—4 of Fig. 3; Fig. 5 is an enlarged sectional view of the separator and the conventional container cap taken from the line 5—5 of Fig. 4; and Fig. 6 is a transverse sectional view taken from the line 6—6 of Fig. 5.

Similar characters of reference refer to similar parts and portions throughout the several views of the drawing.

The container 1 and container cap 2 are of conventional type now in use. Secured to the cap 2 in any manner desired, but preferably by means of wire loops 3 and 4, is a partition supporting strip 5 which is shaped as shown best in Figs. 1 and 5 of the drawing and is preferably made of transparent material such as Cellophane, but may be made of various types of material as desired. It is preferred to split the member forming bifurcated ends 5a and 5b, and this strip preferably tapers and is narrower at its upper extended end. The upper end is fitted under the members 3 and 4 so that, if desired, it may be readily removed or the same may be secured rigidly so that it cannot be removed, as desired.

Secured on the lower end to the bifurcated portions 5a and 5b is a partition member 6 which serves as a partition or separator between the cream and milk in the container and is shifted to form a positive partition between the cream and milk or is shifted downwardly in the converging portion of the container to permit space for the cream to pass said partition and rise readily to the top in the container.

It will be noted that this partition 6 is secured by means of wire clips 6a and 6b at its opposite sides, as shown best in Figs. 1, 2 and 5 of the drawing. However, these bifurcated members may be readily secured otherwise or may be an integral part of the partition 6, if desired. It will be noted that this partition 6 is so shaped that its periphery is adapted to engage the inner surface of the inclined or converging portion of the container when raised to the proper position, which proper position is approximately the line between the cream and milk in the container.

It will be noted that it is preferred to position the support for the partition approximately centrally in the container top, as shown best in Fig. 1 of the drawing.

It will be also noted that this support may be carried back through the clip 3 as shown best in Fig. 5 of the drawing for reinforcing the support at the bend where it is turned over the top of the container, as shown in Fig. 2 of the drawing, although this is not essential.

The operation of my cream line separator for milk containers is substantially as follows:

The device is placed in a free hanging position completely enclosed in the container and arranged substantially as shown in Fig. 1 of the drawing and is supported by the conventional cap of the container with its periphery spaced from the wall of the container so that the cream will readily rise between the wall of the container and the periphery to the top. Then when it is desired to remove the cream and leave the milk in the container, the cap is removed and the flexible support 5 is bent over the top, as shown in Fig. 2 of the drawing, whereupon the container may be tilted and the cream poured from the container in the conventional way and the milk will be held by the partition 6. This partition 6 will hold the milk when the bottle is turned upsidedown. Then by replacing the bottle to its upright position and the cap and strip member 5 shifted to the dash line position A to release the tension on and shift the partition 6, the milk can then be poured so that the contents is entirely emptied from the container. When the cap 2 is in the dash line position A, as shown in Fig. 2, the curves of the supporting strip 5 are all substantially straightened out when the supporting strip 5 engages the inner side of the container neck portion. The dash line position B shows the container cap and support raised and in straightened position which is in an intermediate position between the two operative positions. If it is desired to mix the milk and cream together with the partition in the position shown in Fig. 1 of the drawing, the container may be shaken and agitated so that the milk and cream will mix together in the conventional manner, or if it is desired, to transport the cream and milk simultaneously in unmixed condition, the partition can be raised to the closed position, as shown in Fig. 2, and the conventional cap can be removed from the support 5 and the support 5, turned and held by hand over the edge of the container and the cap placed in position again by slightly distorting the edge of the cap, which holds the partition in position and may be transported or agitated without mixing of the milk and cream.

Though I have shown and described a particular construction, combination and arrangement of parts and portions, and a certain conventional container and cap, I do not wish to be limited to this particular construction, combination and arrangement, nor to the particular containers, but desire to include in the scope of my invention the construction, combination and arrangement substantially as set forth in the appended claims.

Having thus described my invention, what I claim as new and desire to secure by Letters Patent is:

1. In a cream line separator for milk containers of the class described, the combination with the conventional milk container cap, which fits with its edge in the opening of said milk container of a partition arranged to be placed in the container through the opening at the top and means connecting said cap and partition for shiftably supporting said partition substantially at the line between the cream and milk in the container.

2. In a cream line separator for milk containers of the class described, the combination with the conventional milk container cap, of a partition arranged to be placed in the container through the opening at the top and means connecting said cap and partition for shiftably supporting said partition substantially at the line between the cream and milk in the container, said means for shiftably supporting the partition including a curved portion adapted to fit over the edge of the top of the container for holding said partition tightly in the container neck when the container cap is removed from the container opening.

3. In a cream line separator for milk containers of the class described, the combination with the conventional milk container cap, of a partition arranged to be placed in the container through the opening in the top and means connecting said cap and partition for shiftably supporting said partition substantially at the line between the cream and milk in the container, said means for shiftably supporting the partition including a curved portion adapted to fit over the edge of the top of the container for holding said partition tightly in the container neck when the container cap is removed from the container opening, said means for shiftably supporting said partition being readily removable from said conventional milk container cap.

4. In a cream line separator for milk containers of the class described, the combination with a conventional milk container and a conventional cap therefor, which fits with its edge in the opening of said milk container of a separator including a partition supporting strip and a partition secured on the lower end thereof, the upper end of said partition supporting strip being secured to said conventional cap, said conventional cap being positioned in the upper end of said container entirely enclosing and supporting said separator and supporting strip in said container.

5. In a cream line separator for milk containers of the class described, the combination with a conventional milk container cap which fits with its edge in the opening of said milk container of a sanitary moisture proof non-metallic flexible partition arranged in a free hanging position from said container cap and completely enclosed with the milk in the conventional container with the cap thereon, said partition being at the approximate line between the milk and cream in the container.

EZEKIEL HANSON.